(12) United States Patent
Munter et al.

(10) Patent No.: US 7,661,070 B1
(45) Date of Patent: Feb. 9, 2010

(54) SOURCE IDENTIFICATION ON A DISPLAY SCREEN

(75) Inventors: Aaron Daniel Munter, San Francisco, CA (US); Timothy Eddie Allen, San Francisco, CA (US); Nigel Leigh Pegg, Berkeley, CA (US)

(73) Assignee: Adobe Systems Inc., San Jose, CA (US)

( * ) Notice: Subject to any disclaimer, the term of this patent is extended or adjusted under 35 U.S.C. 154(b) by 333 days.

(21) Appl. No.: 11/545,203

(22) Filed: Oct. 10, 2006

(51) Int. Cl.
*G06F 3/048* (2006.01)

(52) U.S. Cl. .................... 715/781; 715/709; 715/795; 715/788; 715/798; 715/799; 715/804

(58) Field of Classification Search ............... 715/709, 715/711, 710, 705, 706, 707, 708, 783, 781, 715/799, 798, 804, 810, 821, 795
See application file for complete search history.

(56) References Cited

U.S. PATENT DOCUMENTS

| | | | | |
|---|---|---|---|---|
| 6,201,548 B1 * | 3/2001 | Cariffe et al. | ............... | 345/620 |
| 6,396,520 B1 | 5/2002 | Ording | ..................... | 345/798 |
| D496,941 S | 10/2004 | Ording | ..................... | D14/485 |
| 7,530,026 B2 * | 5/2009 | Chaudhri et al. | ............ | 715/764 |
| 2002/0118227 A1 | 8/2002 | Salvatore | ..................... | 345/764 |
| 2003/0142139 A1 | 7/2003 | Brown et al. | ................ | 345/800 |
| 2004/0267981 A1 * | 12/2004 | Kakemura | ................... | 710/48 |
| 2005/0289478 A1 * | 12/2005 | Landman et al. | ........... | 715/804 |

OTHER PUBLICATIONS

Adobe Education, Lesson 5.3: Photoshop Basics, Jul. 2004, http://web.archive.org (Internet Archive Wayback Machine).*

* cited by examiner

*Primary Examiner*—Tadesse Hailu
*Assistant Examiner*—Nicholas S Ulrich
(74) *Attorney, Agent, or Firm*—Chapin IP Law, LLC (57) ABSTRACT

A display application can be configured to provide a visual indication associating a dialog box (that was not invoked for display by a user) to a user selectable source on a display screen. In such circumstances, because the dialog box was not actually invoked based on actions of by the user, the user may be unaware of how to invoke redisplay of the dialog box. The visual indication (e.g., a highlighting of a path between the dialog box and a user selectable source such as an icon) produced by the display application teaches a user of a location of the selectable source so that the user can select the selectable source at a future point in time and redisplay the window.

29 Claims, 9 Drawing Sheets

SOURCE IDENTIFICATION ON A DISPLAY SCREEN

FIELD OF THE INVENTION

One embodiment of the present disclosure relates generally to display applications and/or graphical user interfaces. More particularly, certain embodiments disclosed herein relate to providing a visual indication on a display screen, associating a window region to a user-selectable source.

BACKGROUND

Conventional graphical user interfaces often provide users with a variety of ways to interact with a software application that executes on a corresponding computer. One way involves displaying text or other content in a pop-up window on a display screen. A pop-up window (e.g., a dialog box) typically prompts a user to provide input required by the application.

The content displayed in a dialog box can include, for example, information about the current state of the application or current user preferences. The input prompted by the dialog box may be for the user to simply acknowledge the information. For example, a dialog box may be configured to display information about the application as well as display an "OK" button. The user can click on the "OK" button to signal the corresponding display application to remove the dialog box from the display screen.

In addition to merely displaying information, a dialog box can prompt a respective user to input data. For example, the dialog box may prompt a user to enter information (e.g., a user name or a file name) or to choose between multiple items displayed in the dialog box.

SUMMARY

As discussed above, conventional display applications will sometimes display a dialog box or a popup window, prompting input from a user. After receiving input from the user, the application will initiate removal of the dialog box from a display screen. If display of the dialog box happens to be initiated by the user, presumably the user will know how to reinitiate display of the dialog box, if necessary, at a later time.

As an example, a user may initially open a menu and select a menu item. Selection of the menu item may cause a corresponding dialog box to thereafter appear on a display screen. The dialog box may prompt the user to provide "setting" type of information, such as preferences that affect a performance of an application. After the user enters the information into the dialog box, the corresponding application initiates removal of the dialog box. If, at a later point in time, the user wishes to change the information entered in the dialog box, the user can reinitiate a display of the dialog box in the same manner that the user previously initiated the display of the dialog box.

Certain applications automatically initiate display of a dialog box without actual selection of a command by a user to produce the dialog box on a display screen. For example, when an application first begins executing (or at some other time during execution of the application), the application may automatically initiate the display of a dialog box to inform a user or prompt input from the user. If the purpose of the application is to facilitate a teleconference between two parties, the application may display a dialog box that prompts the user to input a telephone number (of the user) to enable the user to join the teleconference. After entry of a telephone number by a user, the application initiates removal of the dialog box window from the display screen and automatically dials the telephone number on behalf of the user. The user may wish to change the previously entered telephone number at a later point in time. However, in certain cases, since the user did not initiate the display of the dialog box, the user may not know how to reinitiate display of the dialog box to change the telephone number.

Techniques discussed herein deviate with respect to conventional applications such as those discussed above and other techniques also known in the prior art. That is, embodiments disclosed herein provide a visual indication associating a window (e.g., a region on a display screen prompting input from a user such as a dialog box) to a selectable source on a display screen. The selectable source on the display screen enables a user, at a later point in time, to selectively view information previously displayed in a closed window. A display application can be configured to provide a visual path from the window being closed to the selectable source at times when the initial display of the window was not invoked by a user. In such circumstances, because the window displayed to the user was not necessarily invoked by the user, the user may be unaware of how to invoke the display of the window again. Even if the user invokes display of the window, the user may be unaware of a respective location of a selectable source that can be used to re-display the window after it is closed. According to embodiments herein, a display application produces a visual indication (e.g., a path between a window such as a dialog box and a selectable source such as an icon) to teach a user of the location of the selectable source so that the user can locate and thereafter select the selectable source at a future point in time and redisplay a previously closed window.

Accordingly, in one embodiment, a display application displays a window region associated with a currently displayed application window. In response to receiving input with respect to the window region, the display application initiates a removal of the window region from the display screen. Also, in response to receiving input with respect to the displayed window region and removal of the window region from the display screen, the display application provides a visual indication associating the window region to a selectable source associated with or in the currently displayed application window. The selectable source enables selective viewing of information previously displayed in the window region prior to the removal. For example, the window region can be a dialog box presented to a user on a display screen. Upon closing of the dialog box, the display application provides a visual indication to a selectable source on the display screen for potentially initiating re-display of the dialog box and/or related information.

Providing a visual indication between a recently closed window (or window that is about to be closed) and a location of a corresponding selectable source to re-initiate display of the closed window is a particularly beneficial way to inform a user of a whereabouts of the corresponding selectable source. Otherwise, the user may not be able to easily re-initiate display of the closed window and/or access information that is associated with the closed window.

Additional embodiments herein include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment herein. This latter embodiment provides a way of creating, modifying, and displaying transitions associated with overlapping content.

Yet other embodiments herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware other such configurations can be installed onto a computerized device to cause the computerized device to perform the techniques explained herein.

Accordingly, one particular embodiment of the present application is directed to a computer program product that includes a computer readable medium having instructions stored thereon for supporting operations of displaying windows on a display screen. The instructions, when carried out by a processor of a respective computer device, cause the processor to perform the steps of: i) displaying, on the display screen, a window region associated with a currently displayed application window; and ii) in response to receiving input with respect to the window region: a) initiating a removal of the window region from the display screen; and b) providing a visual indication associating the window region to a selectable source in the currently displayed application window, the selectable, source enabling selective viewing of information previously displayed in the window region prior to the removal. Other embodiments of the present application include software programs to perform any of the method embodiment steps and operations summarized above and disclosed in detail below.

As discussed above, techniques herein are well suited for use in window display applications such as those that provide information and/or prompt input from a source such as a user. However, it should be noted that embodiments herein are not limited to use in such applications and that the techniques discussed herein are well suited for other applications as well.

It is to be understood that the system according to an embodiment herein can be embodied strictly as a software program, as software and hardware, or as hardware alone such as within a processor, or within an operating system or a within a software application. Example embodiments of the invention may be implemented within products and/or software applications such as those manufactured by Adobe Systems, Inc. of San Jose, Calif., USA. Additional features of the embodiments herein will be further discussed in the Detailed Description section of this application and accompanying figures. Note that the different embodiments herein can be executed independently or in combination with each other.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DESCRIPTION OF EXAMPLE EMBODIMENTS

According to an example embodiment, a display application can be configured to provide a visual indication associating a window (e.g., a window that was not invoked for display by a user) to a user selectable source on a display screen. In such circumstances, because the window was not actually invoked based on actions of by the user, the user may be unaware of how to invoke redisplay of the window or access information associated with the closed window. To alleviate this problem, a display application produces a visual indication (e.g., a highlighting of a path between the window such as a dialog box and a selectable source such as an icon) to teach a user of a location of the selectable source so that the user can select the selectable source at a future point in time and redisplay the window for accessing information associated with the previously closed window.

Figure 1:
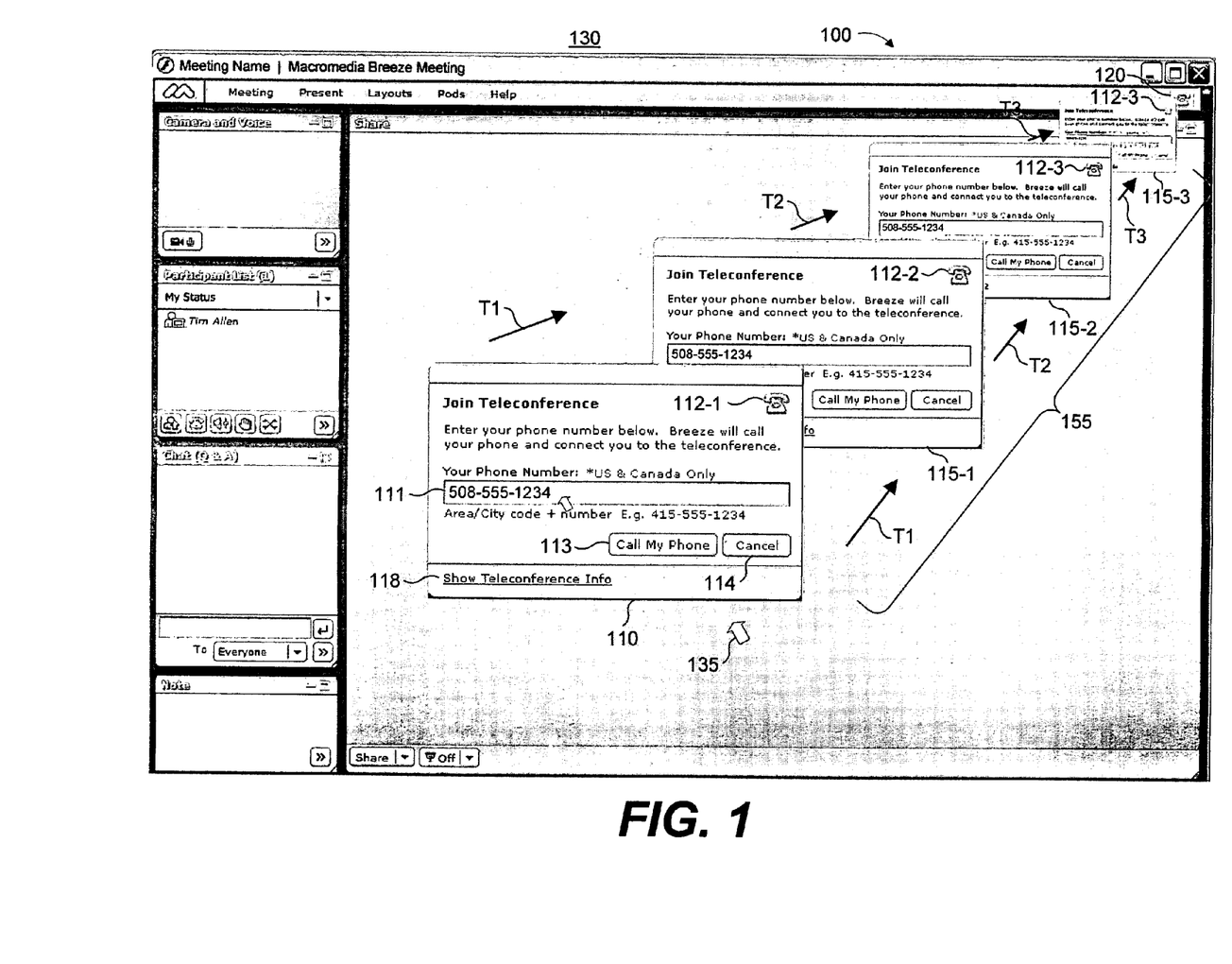
FIG. 1 is an example screenshot illustrating association of a window region to a selectable source in a currently displayed application window according to embodiments herein.

FIG. 1 is a screenshot illustrating a view of application window 100 (e.g., a graphical user interface) displayed on a display screen 130 (e.g., a computer monitor, computer screen, video display, etc.) according to embodiments herein. A software display application running on a computer system displays the application window 100 in response to the software application being launched on an operating system of the computer system. For example, via use of a computer mouse, a user can click on an icon of a so-called "desk top" on display screen 130 and initiate launching of a respective software application on a computer system that displays the application window 100 on the display screen 130. Via movement of a corresponding computer mouse, cursor 135 enables the user to initiate commands with respect to application window 100.

In general, the application window 100 produces a visual indication 155 associating a window region 110 (e.g., a dialog box, window, pop-up window, etc.) with a selectable source 120 (e.g., icon, software button, etc.) in the displayed application 100. The corresponding software application can display the application window 100 to provide information to or prompt input from a user. In certain cases, when displaying the window region 110, the software application produces the window region 110 so that it appears to be overlaid on top of the application window 100 as shown. However, the window region 110 can appear in other positions with respect to the application window 100 such as to the side of the application window 100, rather than being overlaid on application window.

In one example embodiment, the software application displays the window region 110 on the application window 100 independent of a user selecting display of the window region 110. In other words, display of the window region 100 may occur automatically without actual initiation of the window region 100 by a user. For example, the software application can initiate execution of a corresponding display routine to display the window region 110 when: i) a software application first begins executing, ii) the software application wishes to display information to a user, iii) the software application learns that it needs input from the user, etc. Accordingly, the software application may execute a display routine associated with the corresponding software application to initiate the display of a window region requesting preference information from a user of the software application without the user requesting, in any way, to enter or change any preferences (e.g., setting information) related to the executing of the software application.

Note that the window region 110 can also be displayed on display screen 130 in response to a respective user initiating display of the window region 110. For example, a user can click on selectable source 120 to initiate display of window region 110. Additionally, the user can click on one or more other selectable buttons (e.g., either selectable source 120 or other buttons other tan selectable source 120) present in or supported by application window 100 to initiate display of the window region 110 on display screen 130.

In the example of FIG. 1, the window region 110 prompts a user to input a telephone number via data entry field 111. In addition to a data entry field 111 for supplying a telephone number, the window region 110 includes: i) a region to display information providing instructions to a user, ii) a selectable link 118 for viewing further information associated with the window region 110, and iii) an image of a telephone image 112 (that is not user-selectable) for visually associating the window region to a selectable source 120. The window region 110 in FIG. 1 displays a phone number entered into the data entry field 111. The user can provide input (e.g., the telephone number) by selecting the "Call My Phone" button 113 or cancel the operation of providing the telephone number and close the window region 110 by selecting the "Cancel" button 114.

Upon receiving the input (e.g., telephone number) by the user, the software application initiates a removal of the window region 110 from being overlaid on the currently displayed application window 100 and provides a visual indication 155 associating the window region 110 (that is being removed from the display screen 130) with the selectable source 120 in the displayed application 100. The association (e.g., visual indication 155) may be performed in any way that is likely to indicate to a user that selecting the selectable source will redisplay the window region 110 again or enable the user to view information previously accessible or associated with the window region 110.

In the context of the present example, the software application creates the visual association between window region 110 and selectable source 120 by displaying a sequence of progressively smaller window regions (e.g., window region 115-1, window region 115-2, and window region 115-3) on a path from the window region 110 to the selectable source 120.

Each of the successively smaller window regions 115 can be displayed on display screen 130 during different time intervals before or after terminating display of window region 110 on display screen 130. That is, during time interval T1 (around a time or just after removal of window region 100), the software application displays a window region 115-1. Around a time or just after a removal of window region 115-1 from display screen 130, the software application displays window region 115-2 during time interval T2. Around a time or just after a removal of window region 115-2 from display screen 130, the software application displays window region 150-3 during time interval T3. After time interval T3, the software application terminates display of window region 115-3 so that there are no longer any window regions (e.g., window region 110, window regions 115) overlaid on application window 100.

Accordingly, the software application displays each progressively smaller window region 115 at a position closer to the selectable source 120 than the previously displayed window region 115. The display of the progressively smaller window regions 115 forms a path to the selectable source 120 providing the visual indication 155 to a user associating the window region 110 to the selectable source 120. Temporarily displaying the window regions 115 along a path from the window region 110 to the selectable source 120 provides an appearance to the user that the window region 110 physically moves towards and eventually shrinks into the selectable source 120. To enhance the visual indication 155, the display application producing application window 100 can visually highlight, flash, or mark selectable source for at least a short duration of time (e.g., a second or so) to indicate the selectable source 120 is the final destination when closing the window region 110.

The window region 110 and the progressively smaller window regions all can include a non-selectable image, such as the telephone image 112, that is visually similar, and potentially substantially similar or even substantially identical, to an appearance of the selectable source 120. The non-selectable telephone images 112 (e.g., images 112-1, 112-2, 112-3, and 112-4) do not enable the user to redisplay window region 110 when clicked by a user. However, the visual similarity of these non-selectable images enhances the visual indication 155 associating the window region 110 with the selectable source 120.

After completion of providing the visual indication 155 associating the window region 110 to the selectable source 120, the software application may continuously display (e.g., continue to display) the selectable source 120 on the currently displayed application window 100 for selection by a user viewing the currently displayed application window 100. In other words, the selectable source 120 can be present on the application window 100 at a same time that window region 110 appears on application window 100. The user can initiate removal of the window region 110 as discussed above, in which case, the application window 100 displays selectable source 120 and no longer displays window region 110 (e.g., window) and window regions 115. Upon receiving a selection command with respect to the selectable source 120 still appearing on display screen 130, as will be discussed more particularly in FIG. 3 of this specification, the software application may overlay a subsequent window region on the currently displayed application window 100. The subsequent window region may be populated with at least a portion of the information previously displayed in the removed window region 110.

Figure 2:
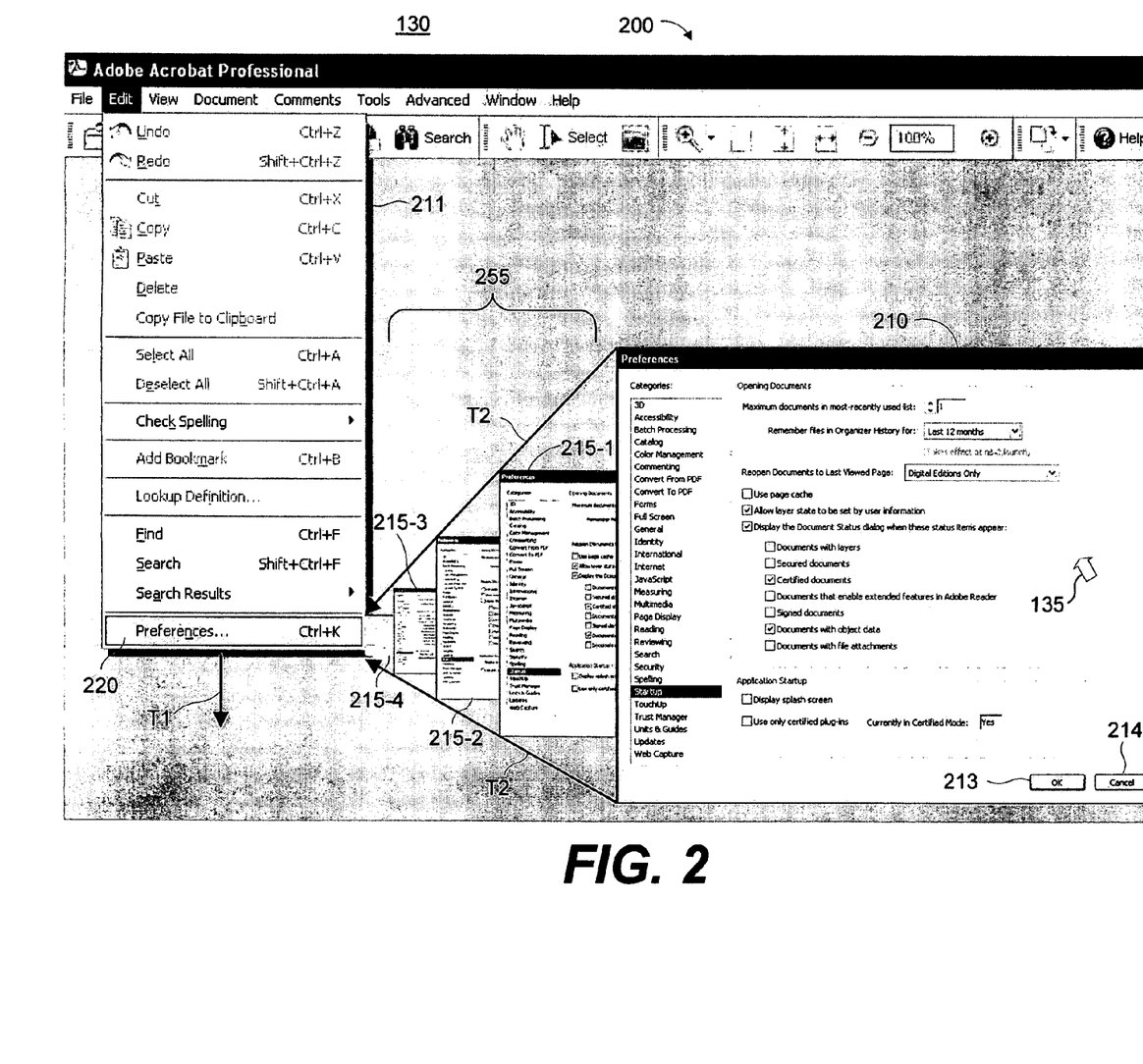
FIG. 2 is an example screenshot illustrating association of a window region to a selectable source in a currently displayed application window according to embodiments herein.

FIG. 2 is a screenshot illustrating a view of an application window 200 displayed on a display screen 130. A corresponding software application may display the application window 200 in response to the software application being launched on an operating system in a similar way as discussed above for application window 100.

In the context of the present example, the screenshot in FIG. 2 illustrates a way of associating window region 210 with a selectable source 220 (e.g., Preferences . . . ) in menu 211 (e.g., a list of commands presented to a user). Initially, the corresponding software application displays the application window 200 and overlays the window region 210 over a region of the displayed application window 200 as shown.

In a similar manner as discussed above, the software application can initiate display of the window region 210 on the currently displayed application window 200 independent of a user actually selecting display of the window region 210 on display screen 130.

For example, the software application initiating display of application window 200 can automatically initiate display of window region 210 when the software application is launched by a user and the application first begins executing. For example, the software application may execute a display routine associated with the corresponding software application to initiate the display of a window region requesting preference information from a user of the software application without the user requesting, in any way, to enter or change any preferences related to the executing of the software application.

Alternatively, note that a user can initiate display of window region 210 on display screen 130.

As shown in FIG. 2, the window region 210 can be a dialog box prompting user input. In this example, the window region 210 prompts a user to input user preferences that affect how the software application will perform in the future. The window region 210 includes a number of features enabling the user to enter or change preference type information associated with the software application. The user can initiate application of newly provided settings by selecting the "OK" button 213. Alternatively, the user can cancel application of the newly provided settings by clicking on or the "Cancel" button 214.

Upon receiving such input, the software application initiates a removal of the window region 210 from being displayed on the application window 200 and provides the visual indication 255 associating the window region 210 with the selectable source 220 in the displayed application 200. The association may be performed in any way that is likely to indicate to a user that a later selection of the selectable source 220 can cause a redisplay of the window region 210 or similar information. The software application creates the visual indication 255 by displaying a sequence of progressively smaller window regions 215-1, 215-2, 215-3, 215-4 on a path from the window region 210 to the selectable source 220 in opened menu 211.

Different time intervals, in the time period during which the display regions 215 are displayed, are indicated by arrows T1, T2. That is, during time interval T1, the software application opens the menu 211 and displays the selectable source 220. During time interval T2 (after completion of T1), the software application removes the window region 210 from the displayed application window 200 and (either at the same time or soon thereafter) sequentially displays the progressively smaller window regions 215 in a manner similar to the displaying of the progressively smaller window regions 115 as discussed above for FIG. 1. A temporary display of each of the window regions 215 along a path from the window region 110 to the selectable source 120 creates an illusion that the window region 210 moves towards and eventually shrinks into the selectable source 220 of menu 211.

In particular embodiments, additional menus may need to be opened in order to provide the visual indication 255 associating the window region 210 with the selectable source 220. That is, opening menu 211 may show that one of the menu items in the menu 211 is itself a menu. This second menu may then be opened, displaying the selectable source 220. In this manner, a software application can provide the visual indication 255 regardless of how many menus need to be opened to display the selectable source 220.

According to one configuration, the display application associated with application window 200 can at least temporarily highlight (e.g., via coloring, shading, etc.) or mark (e.g., via a symbol) the entry in menu 211 to enhance the visual indication 255 that the window region 210 physically merges into selectable source 220. The highlighting or marking can be time-based such that the highlighting or symbol lasts for a specified duration of time such as little as less than a second as much as several hours or more. Accordingly, if a user pulls down the menu at a later time, the user will be reminded the "merge" location as previously discussed.

By providing a user with a visual indication 255 associating window region 210 with a selectable source 220 in menu 211, the application teaches the user of a location of the selectable source 220. The selectable source 220 can be used to redisplay the window region 210 at a later point in time. That is, the software application may display a subsequent window region on the display screen 130 at a later point in time after receiving input from a user, such as clicking on the selectable source 220. For example, based on input from a user, the application may present a subsequent window (e.g., a redisplay of window region 210) on the currently displayed application window 200. This is more particularly shown in FIG. 3.

Figure 3:
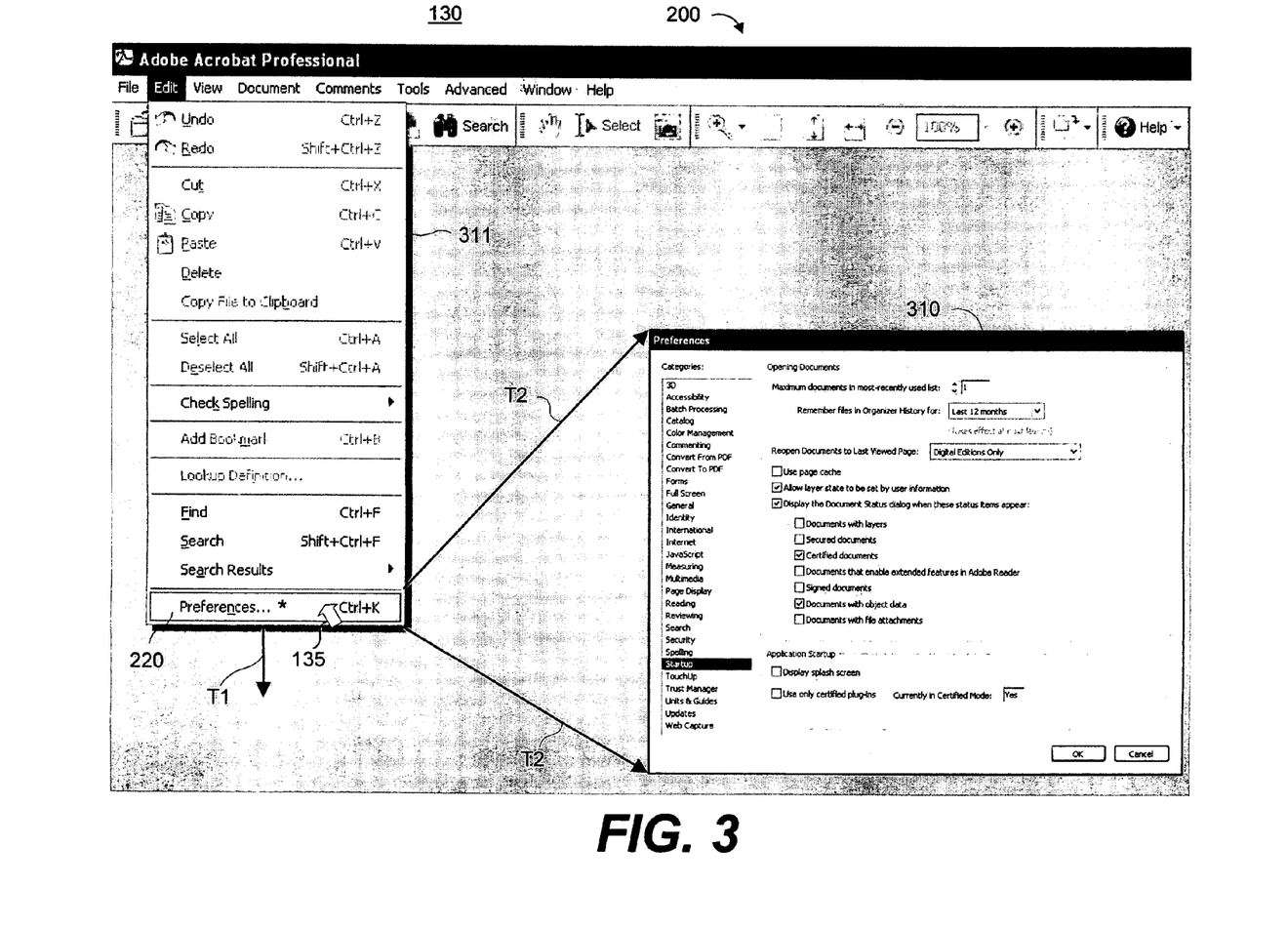
FIG. 3 is an example screenshot illustrating selection of a source to produce a previously displayed window according to an embodiment herein.

FIG. 3 is a screenshot illustrating display of application window 200 on display screen 130 according to embodiments herein. In one embodiment, based on selection (e.g., clicking on the "Edit" icon) of menu 311 (e.g., a pull-down menu) by a user at time T1, the software application opens the menu 311, displaying multiple selectable sources (e.g., check spelling, find, search, etc.) as entries in the menu 311. In this example, one of the multiple selectable sources in menu 311 is the selectable source 220 that was previously displayed to a respective user as discussed above with respect to FIG. 2.

In particular embodiments such as that shown, the software application (and corresponding underlying processing functions) displaying application window 200 detects the presence of a cursor 135 in close proximity to a given selectable source (e.g., the selectable source 220 in menu 311) of the multiple selectable sources. A user controls the cursor 135 with a selection tool such as a handheld mouse. In response to detecting the presence of the cursor 135 in close proximity to a given selectable source, the software application 200 highlights (e.g., via shading or other distinguishing mark) the given selectable source 220 (e.g., Preferences entry in menu 311) as long as the cursor 135 remains in close proximity to the given selectable source 220. For example, the selectable source 220 is highlighted as shown in FIG. 3. In lieu of highlighting the selectable source 220, other entries in menu 311 would be highlighted if the user happens to move the cursor 135 in close proximity to other respective entries in menu 311.

As previously discussed, in response to detecting the presence of the cursor 135 in close proximity to a given selectable source 220, the software application displays a corresponding window region 310 (e.g., window) associated with the given selectable source 220 in menu 311 as long as the cursor 135 remains in close proximity to the given selectable source 220. For example, prior to actual clicking on an entry in menu 311, the application window 200 displays the corresponding dialog box associated with the entry of menu 311 depending on which entry is in close proximity to the current position of the cursor 135. Accordingly, prior to actual clicking on an entry in menu 311, the user can be shown a preview of a corresponding dialog associated with the selected entry that will remain on the application window 200 without actually having to click on the respective entry in menu 311.

Note that one configuration herein includes providing a visual indication (such as an asterisk in the present example) to indicate that the entry in the menu 311 corresponds with the previously displayed window region 210 as discussed above with respect to FIG. 2.

Selecting and/or clicking on the selectable source 220 will cause application window 200 to reproduce the same or similar "Preference" window as discussed above. For example, window region 310 may be populated with at least a portion of the information previously displayed in the window region 210 as shown in FIG. 2. If the software application displaying application window 200 detects that the cursor 135 is no longer in close proximity to the given selectable source but is in close proximity to the check spelling entry of menu 311, then the software application closes the corresponding window region associated with the given selectable source 220 and displays a dialog box (e.g., another window region) associated with the newly selected entry in menu 311.

According to one configuration, in response to clicking on the selectable source 220 in menu 311, the software application discontinues displaying the given selectable source. For example, in response to clicking on the selectable source 220 in menu 311 after the user decides that this is the dialog box to be displayed, the software application discontinues displaying the given selectable source 220 by closing the menu 311. Because the user clicks on the selectable source 220, the software application also continues to display the corresponding window region 310 associated with the given selectable source even after the cursor 135 is no longer in close proximity to the given selectable source. That is, upon detection that a user has selected the selectable source 220 by clicking on it, the software application may close the menu 311 and continue displaying the window region 310 so that the user can provide data and/or commands with respect to the window region 311.

Providing the ability to preview the dialog boxes while scrolling down entries in menu 311 in the manner as discussed herein is useful because the user can be presented with viewings of respective dialog boxes without the user having to actually click on the respective entries in the menu 311 to view the dialog box (e.g., window region 310). Conventional methods require clicking on an entry in a menu to view a respective dialog box. Clicking on an entry closes the pull-down menu. If a user happens to choose the wrong entry in the menu, the user must repeatedly reopen the menu and make selections of other entries in the menu until finding the appropriate dialog box. The techniques herein enable the use to view the different windows without having to close the menu 311.

As an alternative to the enhanced previewing technique as discussed above, the application window 200 can be configured to display a menu 311 according to convention methods. For example, a user can open menu 311 and click on entries in the menu 311. Clicking on an entry in menu 311 causes the menu 311 to close as well as causes the window region 311 to appear on the display screen 130. The asterisk in the entry of the menu 311 indicates which entry corresponds to the window that automatically popped up as previously discussed above with respect to FIG. 2. Accordingly, marking an entry in menu 311 enables the respective user to easily identify a location of a selectable source for reopening the window region 210 as discussed above with respect to FIG. 2.

Figure 4:
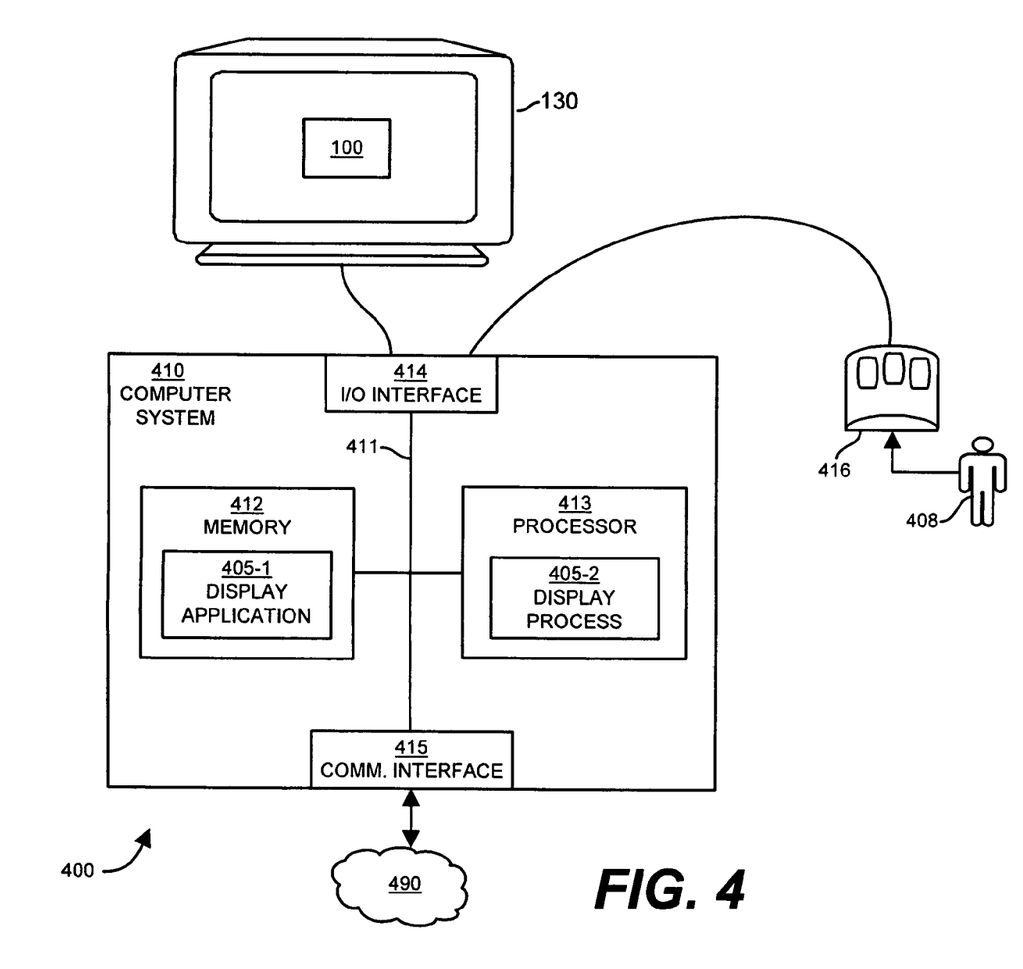
FIG. 4 is an example of a computer environment and corresponding computer system for executing a display application according to embodiments herein.

FIG. 4 is a block diagram of a computer environment 400 illustrating an example architecture of a respective computer system 410 for implementing a display application 405-1 according to embodiments herein. Computer system 410 can be a computerized device such as a personal computer, workstation, portable computing device, console, network terminal, processing device, etc.

As shown, computer system 410 of the present example includes an interconnect 411 that couples a memory system 412, a processor 413, I/O interface 414, and a communications interface 415. I/O interface 414 potentially provides connectivity to peripheral devices such as a keyboard, mouse (e.g., a selection tool 416), display screen 130, etc. User 408 provides input to computer system 410. Communications interface 415 enables computer system 410 to communicate over network 490 to retrieve and transmit information from remotely located sources if necessary.

As shown, memory system 412 is encoded with display application 405-1 that supports display functionality as discussed above for FIGS. 1-3 and as further discussed below. Display application 405-1 can be embodied as software code such as data and/or logic instructions (e.g., code stored in the memory or on another computer readable medium such as a disk) that supports processing functionality according to different embodiments described herein. During operation of one embodiment, processor 413 accesses memory system 412 via the use of interconnect 411 in order to launch, run, execute, interpret or otherwise perform the logic instructions of the display application 405-1. Execution of the display application 405-1 produces processing functionality in display process 405-2. In other words, the display process 405-2 represents one or more portions of the display application 405-1 performing within or upon the processor 413 in the computer system 410.

It should be noted that, in addition to the display process 405-2 that carries out method operations as discussed herein, other embodiments herein include the display application 405-1 itself (i.e., the un-executed or non-performing logic instructions and/or data). The display application 405-1 may be stored on a computer readable medium such as a floppy disk, hard disk or in an optical medium. According to other embodiments, the display application 405-1 can also be stored in a memory type system such as in firmware, read only memory (ROM), or, as in this example, as executable code within the memory system 412 (e.g., within Random Access Memory or RAM).

In addition to these embodiments, it should also be noted that other embodiments herein include the execution of display application 405-1 in processor 413 as the display process 405-2. Thus, those skilled in the art will understand that the computer system 410 can include other processes and/or software and hardware components, such as an operating system that controls allocation and use of hardware resources.

Functionality supported by computer system 410 and, more particularly, functionality associated with display application 405-1 and display process 405-2 will now be discussed via flowcharts in FIGS. 5 through 9. For purposes of the following discussion, computer system 410 or (e.g., display application 405-1 and/or display process 405-2) generally performs steps in the flowcharts. However, other entities can be configured to provide similar functionality.

Note that during the discussion of the flowcharts in FIGS. 5-9, there will be some overlap with respect to concepts discussed above for FIGS. 1 through 4. Also, note that the steps in the below flowcharts need not always be executed in the order shown.

Figure 5:
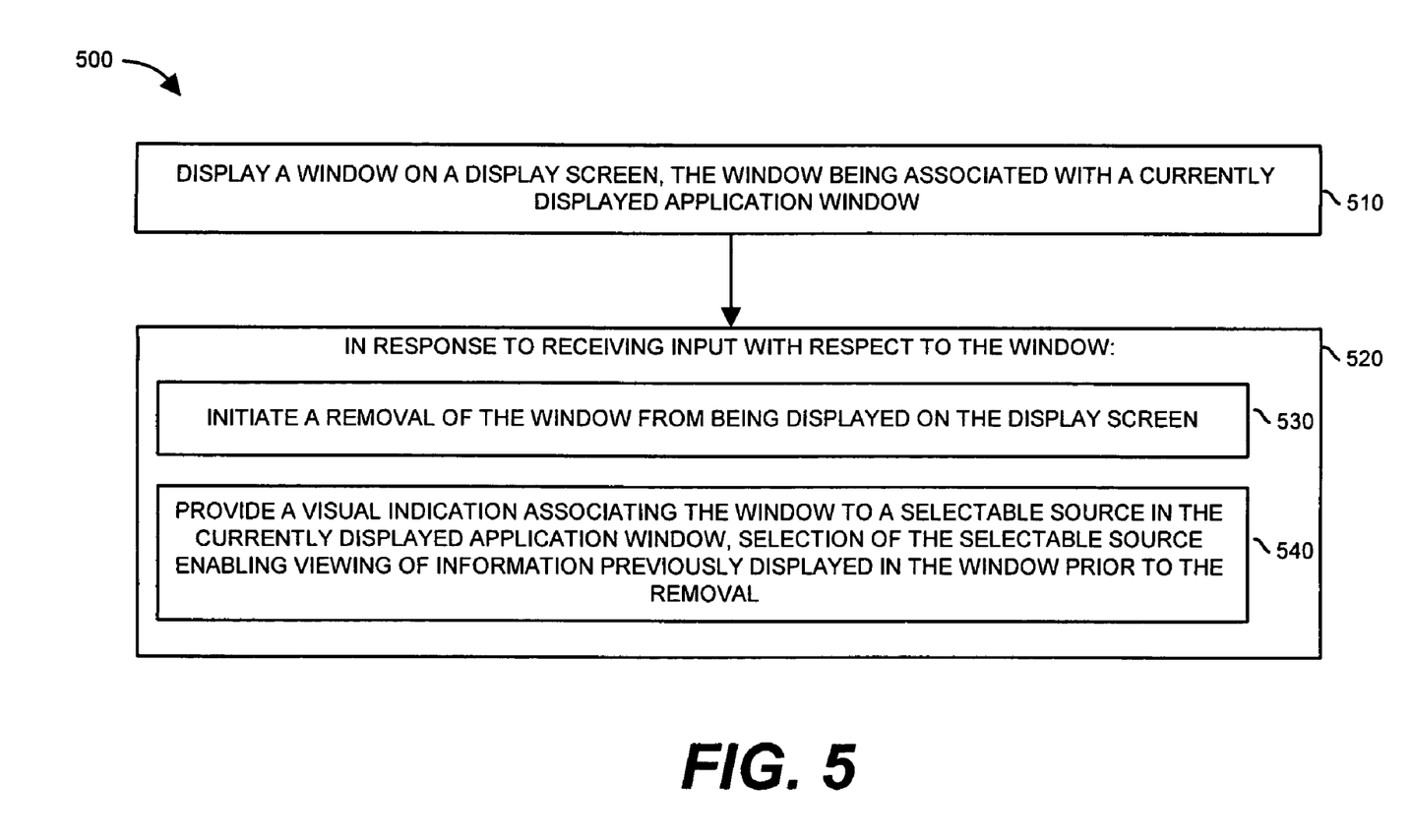
FIG. 5 is an example flowchart illustrating a general technique for associating a window region to a selectable source according to embodiments herein.

FIG. 5 is a flowchart 500 illustrating a general technique for associating a window region to a selectable source according to embodiments herein. Note that flowchart 500 will make reference to matter previously discussed with respect to FIGS. 1-4.

In step 510, display application 405-1 displays a window region (e.g., a window such as a dialog box) associated with a currently displayed application window on a display screen.

In step 520, in response to receiving input with respect to the window region, the display application 405-1 executes substeps 530 and 540 as follows:

In substep 530, the display application 405-1 initiates a removal of the window region from the display screen.

In substep 540, the display application 405-1 provides a visual indication associating the window region to a selectable source in the currently displayed application window, the selectable source enabling selective viewing of information previously displayed in the window region prior to the removal of the window region.

Figure 6:
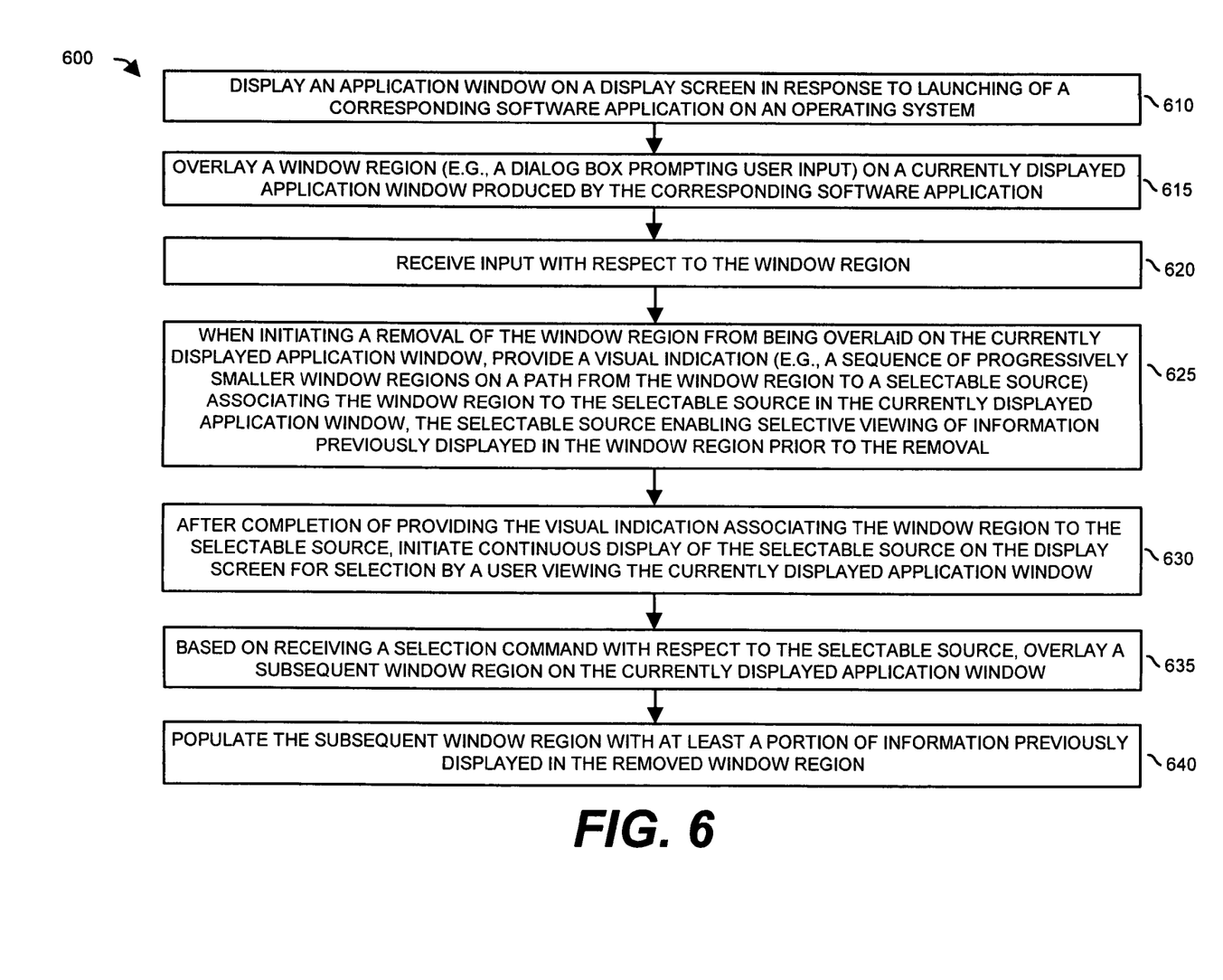
FIG. 6 is an example of a flowchart illustrating a technique for associating a window region to a selectable source according to embodiments herein.

FIG. 6 is a detailed flowchart illustrating a technique for associating a window region to a selectable source according to embodiments herein. Note that flowchart 600 will also make reference to matter previously discussed with respect to FIGS. 1-4.

In step 610, display application 405-1 displays an application window on a display screen in response to launching of a corresponding software application on an operating system.

In step 615, display application 405-1 overlays a window region (e.g., a dialog box prompting user input) on a currently displayed application window produced by the corresponding software application.

In step 620, display application 405-1 receives input with respect to the window region.

In step 625, when initiating a removal of the window region from being overlaid on the currently displayed application window, display application 405-1 provides a visual indication (e.g., a sequence of progressively smaller window regions on a path from the window region to a selectable source) associating the window region to the selectable source in the currently displayed application window. The selectable source enables selective viewing of information previously displayed in the window region prior to the removal.

In step 630, after completion of providing the visual indication associating the window region to the selectable source, display application 405-1 initiates continuous (e.g., for at least a short duration of time such as several seconds or more) display of the selectable source on the display screen for selection by a user viewing the currently displayed application window.

In step 635, based on receiving a selection command with respect to the selectable source, the display application 405-1 overlays a subsequent window region on the currently displayed application window.

In step 640, display application 405-1 populates the subsequent window region with at least a portion of information previously displayed in the removed window region.

Figure 7:
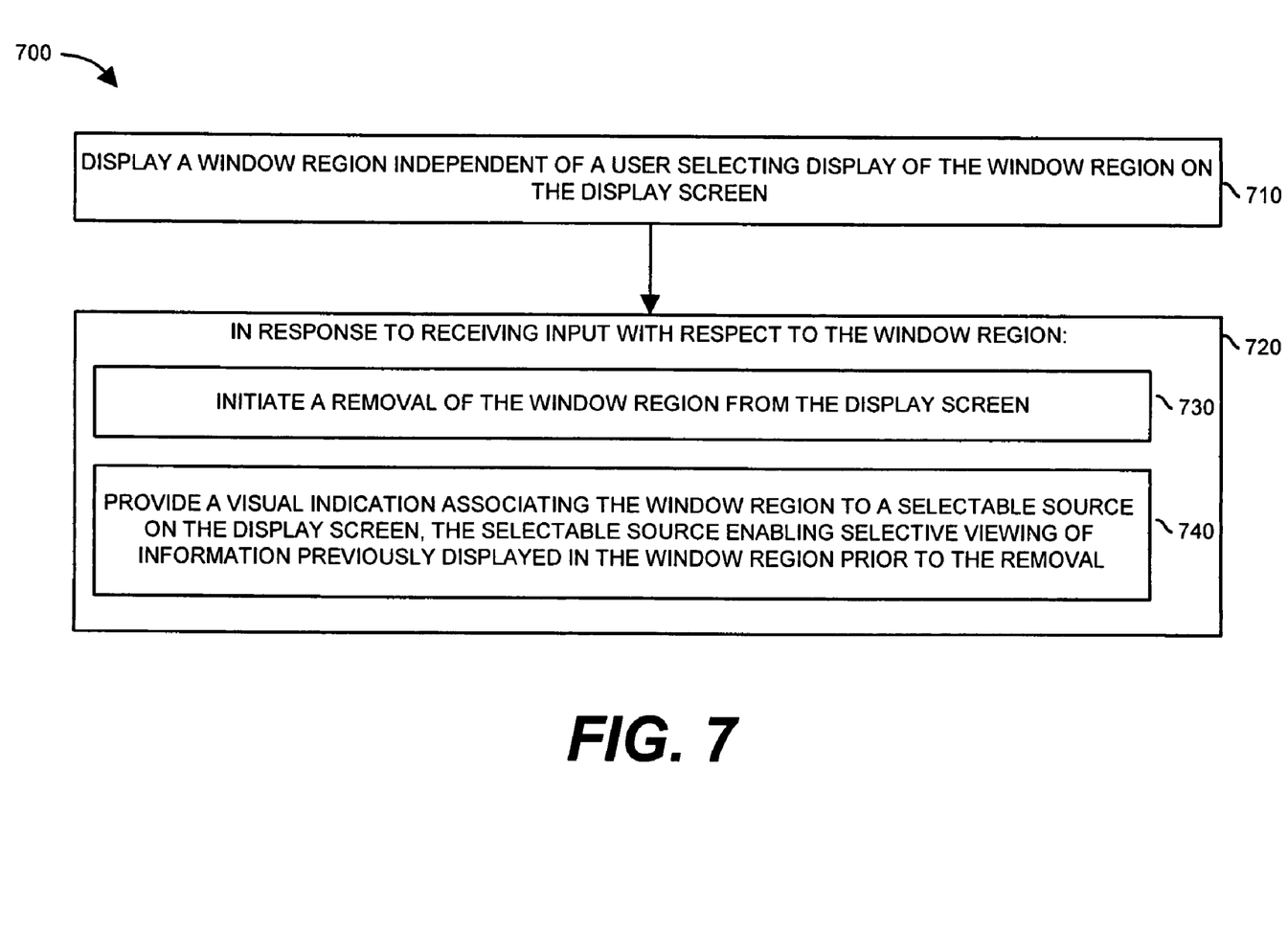
FIG. 7 is an example flowchart illustrating a general technique for associating a window region to a selectable source in a menu according to embodiments herein.

FIG. 7 is a flowchart illustrating a general technique for associating a window region to a selectable source in a menu according to embodiments herein. Note that flowchart 700 will also make reference to matter previously discussed with respect to FIGS. 1-4.

In step 710, display application 405-1 displays a window region independent of a user selecting display of the window region on display screen 130.

In step 720, in response to receiving user input associated with the window region, the display application 405-1 executes substeps 730 and 740 as follows:

In substep 730, the display application 405-1 initiates a removal of the window region from the display screen.

In substep 740, the display application 405-1 provides a visual indication associating the window region to a selectable source on the display screen. The selectable source enables selective viewing of information previously displayed in the window region prior to the removal of the window region.

Figure 8:
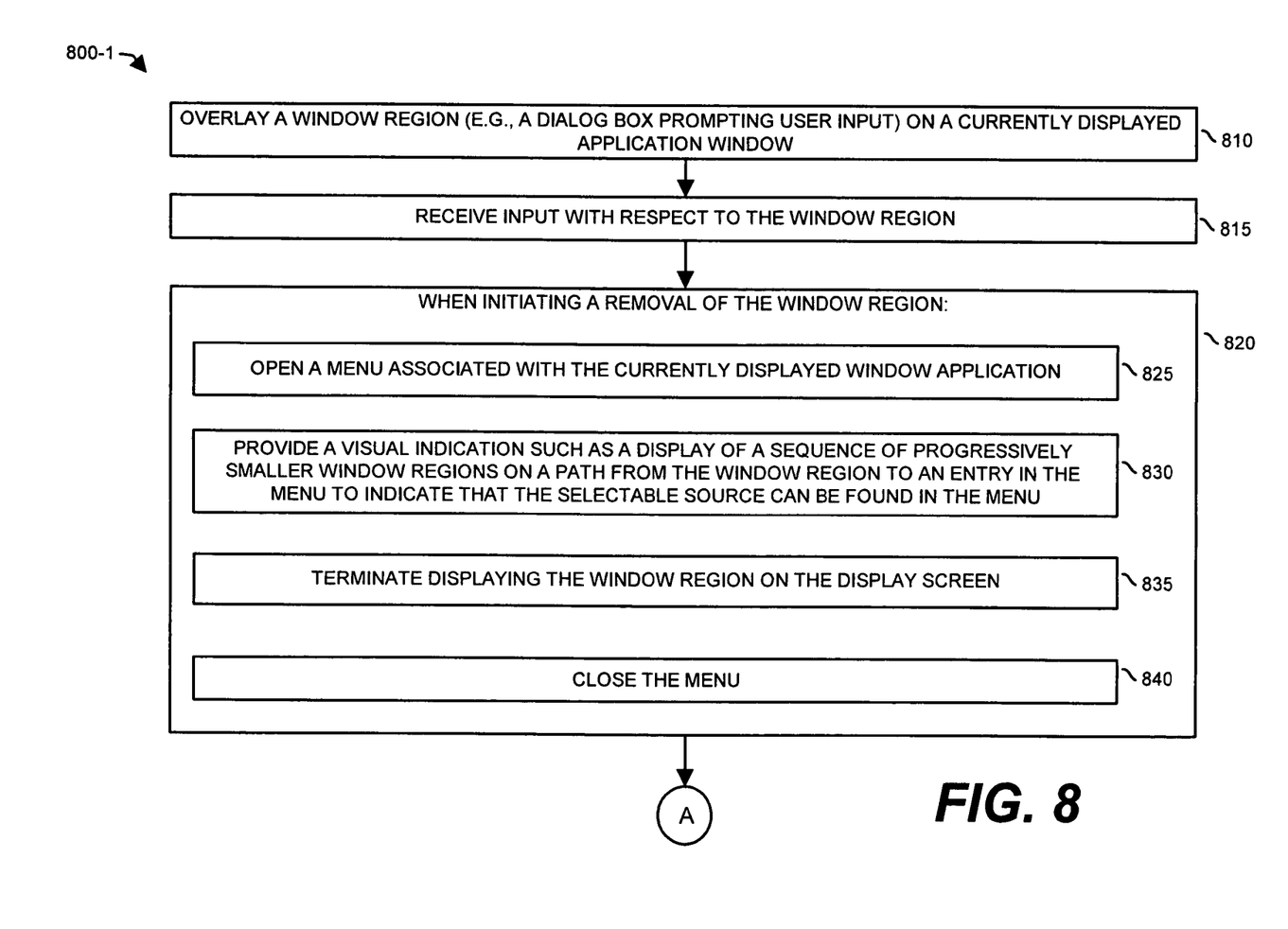
FIGS. 8 and 9 combine to form an example flowchart illustrating a detailed technique for associating a window region to a selectable source in a menu according to embodiments herein.
Figure 9:
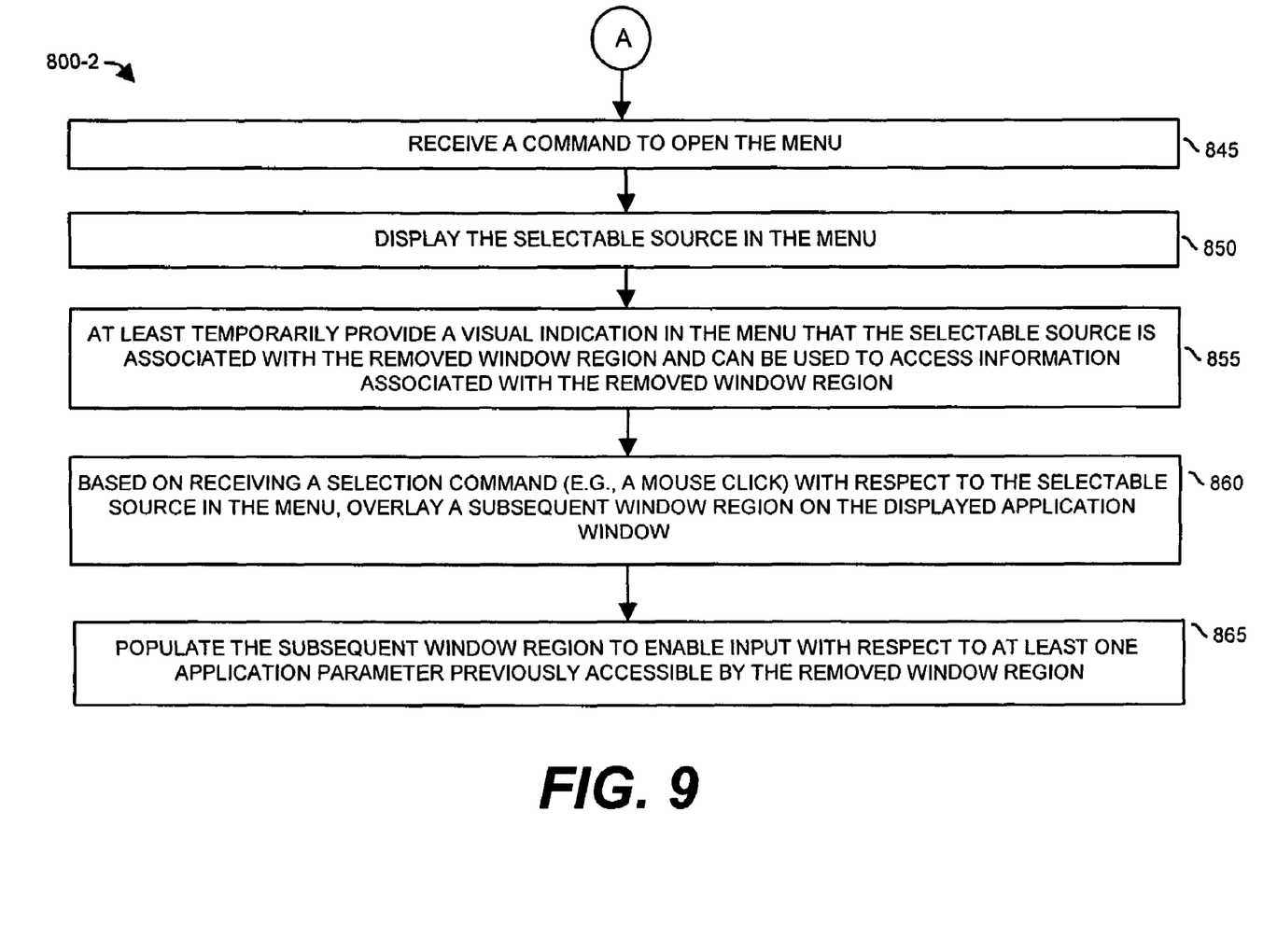

FIGS. 8 and 9 combine to form a flowchart 800 (e.g., flowchart 800-1 and flowchart 800-2) illustrating a detailed technique for associating a window region to a selectable source in a menu according to embodiments herein.

In step 810, display application 405-1 overlays a window region (e.g., a dialog box prompting user input) on a currently displayed application window.

In step 815, display application 405-1 receives input with respect to the window region.

In step 820, when initiating a removal of the window region, the display application 405-1 initiates execution of substeps 825, 830, 835, and 840 as follows:

In substep 825, display application 405-1 opens a menu associated with the currently displayed window application.

In substep 830, display application 405-1 provides a visual indication such as a display of a sequence of progressively smaller window regions on a path from the window region to an entry in the menu to indicate that the selectable source can be found in the menu.

In substep 835, display application 405-1 terminates displaying the window region on the display screen.

In substep 840, display application 405-1 closes the menu.

In step 845, display application 405-1 receives a command to open the menu.

In step 850, display application 405-1 displays the selectable source in the menu.

In step 855, display application 405-1 at least temporarily provides a visual indication in the menu that the selectable source is associated with the removed window region and can be used to access information associated with the removed window region.

In step 860, based on receiving a selection command (e.g., a mouse click) with respect to the selectable source in the menu, display application 405-1 overlays a subsequent window region on the displayed application window In step 865, display application 405-1 populates the subsequent window region to enable input with respect to at least one application parameter previously accessible by the removed window region.

Note again that techniques herein are well suited for use in display applications such as those that produce windows for providing information to and/or prompting input from a user. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method in which at least one computer system accesses instructions from computer storage and executes the instructions comprising steps of:
   displaying a window region associated with a currently displayed application window; and
   in response to receiving input with respect to the window region:
      initiating a removal of the window region; and
      providing a visual indication associating the window region to a selectable source in the currently displayed application window, the selectable source enabling selective viewing of information previously displayed in the window region prior to the removal;
   wherein providing the visual indication comprises:
      opening a menu associated with the currently displayed application window; and
      via the visual indication, indicating that the selectable source can be found in the menu.

2. The method of claim 1, further comprising:
   after providing the visual indication associating the window region to the selectable source, displaying the selectable source for selection by a user viewing the currently displayed application window.

3. The method of claim 1 further comprising:
   at least temporarily providing the visual indication in the menu that the selectable source in the menu can be used to access information associated with the removed window region.

4. The method of claim 1 further comprising:
   based on receiving a selection command with respect to the selectable source, displaying a subsequent window region overlaid on the currently displayed application window; and
   populating the subsequent window region with at least a portion of information previously displayed in the removed window region.

5. The method of claim 1, wherein providing the visual indication comprises displaying a sequence of progressively smaller window regions on a path from a location of the window region to the selectable source.

6. The method of claim 1, wherein displaying the window region occurs in response to execution of a display routine associated with a corresponding software application.

7. The method of claim 1, wherein displaying the window region includes:
   displaying the window region on the currently displayed application window independent of a user selecting display of the window region.

8. The method of claim 1, wherein displaying the window region includes:
   displaying a non-selectable symbol in the window region, the non-selectable symbol being visually similar to the selectable source but not producing a pop-up window when clicked by a user, the selectable source producing a pop-up window that is substantially similar to the removed window region when clicked by the user.

9. The method of claim 1, wherein providing the visual indication occurs around a time of the removal of the window region.

10. A method as in claim 1, wherein displaying the window region associated with a currently displayed application window includes:
    at least partially overlaying the window region over the currently displayed application window.

11. A method in which at least one computer system accesses instructions from computer storage and executes the instructions comprising steps of:
    displaying a window region independent of a user selecting display of the window region; and
    in response to receiving user input associated with the window region:
    initiating a removal of the window region, and
    providing a visual indication associating the window region to a selectable source, the selectable source enabling selective viewing of information previously displayed in the window region prior to the removal;
    wherein providing the visual indication comprises:
       opening a menu associated with the currently displayed application window; and
       via the visual indication, indicating that the selectable source can be found in the menu.

12. The method of claim 11, further comprising:
    after providing the visual indication associating the window region to the selectable source, displaying the selectable source for selection by a user.

13. The method of claim 11, wherein providing the visual indication comprises displaying a sequence of progressively smaller window regions on a path from the window region to the selectable source.

14. The method of claim 11, wherein providing the visual indication comprises displaying a sequence of progressively smaller window regions on a path from the window region to the user-selectable source, each window region in the sequence including a non-selectable image that is visually similar to the user-selectable source.

15. A computer program product including a computer-readable medium having instructions stored thereon for processing data information, such that the instructions, when carried out by a processing device, enable the processing device to perform the operations of:
    displaying a window region associated with a currently displayed application window; and
    in response to receiving input with respect to the window region:
       initiating a removal of the window region; and
       providing a visual indication associating the window region to a selectable source in the currently displayed application window, the selectable source enabling selective viewing of information previously displayed in the window region prior to the removal;
    wherein providing the visual indication comprises:
       opening a menu associated with the currently displayed application window; and
       via the visual indication, indicating that the selectable source can be found in the menu.

16. A computer program product as in claim 15 further supporting operations of:
    after providing the visual indication associating the window region to the selectable source, displaying the selectable source for selection by a user viewing the currently displayed application window.

17. A computer program product as in claim 15 further supporting operations of:
   at least temporarily providing the visual indication in the menu that the selectable source in the menu can be used to access information associated with the removed window region.

18. A computer program product as in claim 15 further supporting operations of:
   based on receiving a selection command with respect to the selectable source, displaying a subsequent window region overlaid on the currently displayed application window; and
   populating the subsequent window region with at least a portion of information previously displayed in the removed window region.

19. A computer program product as in claim 15, wherein providing the visual indication comprises displaying a sequence of progressively smaller window regions on a path from a location of the window region to the selectable source.

20. A computer program product as in claim 15, wherein displaying the window region occurs in response to execution of a display routine associated with a corresponding software application.

21. A computer program product as in claim 15, wherein displaying the window region includes:
   displaying the window region on the currently displayed application window independent of a user selecting display of the window region.

22. A computer program product as in claim 15, wherein displaying the window region includes:
   displaying a non-selectable symbol in the window region, the non-selectable symbol being visually similar to the selectable source but not producing a pop-up window when clicked by a user, the selectable source producing a pop-up window that is visually similar to the removed window region when clicked by the user.

23. A computer program product as in claim 15, wherein providing the visual indication occurs around a time of the removal of the window region.

24. A computer program product as in claim 15, wherein displaying the window region associated with a currently displayed application window includes:
   at least partially overlaying the window region over the currently displayed application window.

25. A computer system comprising:
   a processor;
   a memory unit that stores instructions associated with an application executed by the processor; and
   an interconnect coupling the processor and the memory unit, enabling the computer system to execute the application and perform operations of:
   displaying a window region associated with a currently displayed application window; and
   in response to receiving input with respect to the window region:
      initiating a removal of the window region; and
      providing a visual indication associating the window region to a selectable source in the currently displayed application window, the selectable source enabling selective viewing of information previously displayed in the window region prior to the removal;
   wherein providing the visual indication comprises:
      opening a menu associated with the currently displayed application window; and
      via the visual indication, indicating that the selectable source can be found in the menu.

26. The method as in claim 1, wherein displaying the window region includes:
   providing access to the selectable source of the window region via the currently displayed application window during display of the window region.

27. The method as in claim 26, wherein providing the visual indication includes:
   initiating display of the selectable source; and
   during display of the selectable source, temporarily modifying an appearance of the selectable source by applying the visual indication to the display of the selectable source.

28. The method as in claim 1, comprising:
   providing access to the selectable source of the window region via the currently displayed application window prior to display of the window region.

29. The method as in claim 1, wherein displaying the window region includes:
   presenting the selectable source in a visible, rendered portion of the currently displayed application window during display of the window region.

* * * * *

UNITED STATES PATENT AND TRADEMARK OFFICE
CERTIFICATE OF CORRECTION

PATENT NO. : 7,661,070 B1 Page 1 of 1
APPLICATION NO. : 11/545203
DATED : February 9, 2010
INVENTOR(S) : Munter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Thirtieth Day of November, 2010

David J. Kappos
*Director of the United States Patent and Trademark Office*